US009210300B2

(12) United States Patent
Oami et al.

(10) Patent No.: US 9,210,300 B2
(45) Date of Patent: Dec. 8, 2015

(54) TIME SYNCHRONIZATION INFORMATION COMPUTATION DEVICE FOR SYNCHRONIZING A PLURALITY OF VIDEOS, TIME SYNCHRONIZATION INFORMATION COMPUTATION METHOD FOR SYNCHRONIZING A PLURALITY OF VIDEOS AND TIME SYNCHRONIZATION INFORMATION COMPUTATION PROGRAM FOR SYNCHRONIZING A PLURALITY OF VIDEOS

(71) Applicants: Ryoma Oami, Tokyo (JP); Hiroo Ikeda, Tokyo (JP)

(72) Inventors: Ryoma Oami, Tokyo (JP); Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/366,137

(22) PCT Filed: Nov. 15, 2012

(86) PCT No.: PCT/JP2012/007324
§ 371 (c)(1),
(2) Date: Jun. 17, 2014

(87) PCT Pub. No.: WO2013/094115
PCT Pub. Date: Jun. 27, 2013

(65) Prior Publication Data
US 2014/0313413 A1 Oct. 23, 2014

(30) Foreign Application Priority Data
Dec. 19, 2011 (JP) ................................. 2011-277155

(51) Int. Cl.
*H04N 5/06* (2006.01)
*H04N 5/232* (2006.01)
*G08B 13/196* (2006.01)

(52) U.S. Cl.
CPC ............. *H04N 5/06* (2013.01); *H04N 5/23254* (2013.01); *G08B 13/19602* (2013.01); *G08B 13/19645* (2013.01)

(58) Field of Classification Search
CPC ................. H04N 5/06; H04N 5/23254; G08B 13/19645; G08B 13/19602
USPC ............. 348/169, 521, 36, 38, 116, 113, 118, 348/119, 153, 159, 14.07, 218.1; 382/103, 382/107; 340/435, 436
See application file for complete search history.

(56) References Cited

U.S. PATENT DOCUMENTS 6,542,183 B1 * 4/2003 DeAngelis et al. ........... 348/159
6,873,353 B1 * 3/2005 Valkonen et al. ............... 348/88

(Continued)

FOREIGN PATENT DOCUMENTS

JP 2010-130086 A 6/2010
JP 2010-135926 A 6/2010

OTHER PUBLICATIONS

International Search Report corresponding to PCT/JP2012/007324 dated Dec. 11, 2012 (3 pages).

*Primary Examiner* — Victor Kostak
(74) *Attorney, Agent, or Firm* — Wilmer Cutler Pickering Hale and Dorr LLP

(57) ABSTRACT

A plurality of video acquisition units 100-1 to 100 N acquire videos. A plurality of visual event detection units 101-1 to 101-N provided corresponding to the plurality of video acquisition units analyze the videos acquired by the plurality of video acquisition units 100-1 to 100-N to detect visual events, and generate visual event detection information including time information on when the visual events occur. A visual event integration means 102 integrates the visual event detection information generated by the plurality of visual event detection units 101-1 to 101-N and generates time synchronization information which is used to synchronize the times of the videos acquired by the plurality of video acquisition units 100-1 to 100-N.

12 Claims, 7 Drawing Sheets

(56) References Cited

U.S. PATENT DOCUMENTS

| | | | |
|---|---|---|---|
| 6,989,742 B2* | 1/2006 | Ueno et al. | 340/511 |
| 7,576,639 B2* | 8/2009 | Boyles et al. | 340/435 |
| 7,990,422 B2* | 8/2011 | Ahiska et al. | 348/218.1 |
| 8,665,333 B1* | 3/2014 | Sharma et al. | 348/159 |
| 2002/0030741 A1* | 3/2002 | Broemmelsiek | 348/169 |
| 2002/0115660 A1* | 8/2002 | Jacobsen et al. | 514/218 |
| 2002/0196330 A1* | 12/2002 | Park et al. | 348/49 |
| 2005/0219361 A1* | 10/2005 | Aoki et al. | 348/159 |
| 2006/0125920 A1* | 6/2006 | Criminisi et al. | 348/159 |
| 2006/0284978 A1* | 12/2006 | Girgensohn et al. | 348/143 |
| 2007/0003146 A1* | 1/2007 | Ko et al. | 382/224 |
| 2007/0291118 A1* | 12/2007 | Shu et al. | 348/156 |
| 2008/0219278 A1* | 9/2008 | Bhattacharjee et al. | 370/408 |
| 2008/0291279 A1* | 11/2008 | Samarasekera et al. | 348/159 |
| 2009/0141130 A1* | 6/2009 | Ortiz | 348/159 |
| 2009/0284601 A1* | 11/2009 | Eledath et al. | 348/157 |
| 2010/0141764 A1* | 6/2010 | Nobori et al. | 348/148 |
| 2011/0255739 A1* | 10/2011 | Lee et al. | 382/103 |
| 2012/0114296 A1* | 5/2012 | Luo et al. | 386/224 |
| 2012/0327194 A1* | 12/2012 | Shiratori et al. | 348/47 |
| 2013/0051696 A1* | 2/2013 | Garrett et al. | 382/254 |

\* cited by examiner

TIME SYNCHRONIZATION INFORMATION COMPUTATION DEVICE FOR SYNCHRONIZING A PLURALITY OF VIDEOS, TIME SYNCHRONIZATION INFORMATION COMPUTATION METHOD FOR SYNCHRONIZING A PLURALITY OF VIDEOS AND TIME SYNCHRONIZATION INFORMATION COMPUTATION PROGRAM FOR SYNCHRONIZING A PLURALITY OF VIDEOS

CROSS-REFERENCE TO RELATED APPLICATIONS

This application is a national stage application of International Application No. PCT/JP2012/007324 entitled "Time Synchronization Information Computation Device, Time Synchronization Information Computation Method and Time Synchronization Information Computation Program," filed on Nov. 15, 2012, which claims the benefit of the priority of Japanese Patent Application No. 2011-277155, filed on Dec. 19, 2011, the disclosures of each of which are hereby incorporated by reference in their entirety.

TECHNICAL FIELD

The present invention relates to a time synchronization information computation device for synchronizing a plurality of videos, a time synchronization information computation method and a time synchronization information computation program.

BACKGROUND ART

When the same subject is shot by a plurality of cameras, the times may not be synchronized between the videos shot by the cameras. As a method for synchronizing videos shot by a plurality of cameras for which shooting timings are not synchronized, there is employed a method for synchronizing shooting timings of cameras with reference to a modulation timing of an illuminated light by use of an intensity-modulated illumination device (see Patent Literature 1, for example). The method described in Patent Literature 1 is such that an intensity-modulated illumination light is illuminated and a change in luminance of the illumination light is read by a camera so that a temporal shift between the operations of the illumination device and the camera (shooting device) is computed. Then, a frame time of the camera (shooting device) is adjusted based on the computed temporal shift, thereby reducing a temporal shift.

FIG. 10 is an explanatory diagram illustrating an exemplary structure of a synchronization device. The synchronization device illustrated in FIG. 10 is a device to which the method described in Patent Literature 1 is applied. As illustrated in FIG. 10, the synchronization device includes temporal function generation means 1, shooting means 2, feature computation means 3, temporal correlation computation means 4, and illumination means 5.

The shooting means 2 shoots videos of a subject 8, and outputs the shot videos to the feature computation means 3. The feature computation means 3 has an input of the videos output from the shooting means 2 and outputs a feature temporal function b(t) to the temporal correlation computation means 4. The temporal correlation computation means 4 compares a temporal function a(t) output from the temporal function generation means 1 with the feature temporal function b(t) output from the feature computation means 3 thereby to generate and output time synchronization information.

The operations of the synchronization device illustrated in FIG. 10 will be described below.

At first, the temporal function generation means 1 outputs the temporal function a(t) taking a value defined per frame. Specifically, a rectangular waveform function having a duty ratio of 1:1 at which a positive or negative value is taken for each frame is employed. The temporal function a(t) is output to the illumination means 5 and the temporal correlation computation means 4.

The illumination means 5 illuminates an intensity-changed light on the subject 8 depending on the value of the input temporal function a(t).

The shooting means 2 shoots the subject 8 illuminated with the light from the illumination means 5, and acquires and outputs videos of the subject to the feature computation means 3. The feature computation means 3 computes a total of luminance values in a frame as the feature from the video of the subject, and computes the feature temporal function b(t) as a function indicating a temporal change in the computed feature. The computed feature temporal function b(t) is output to the temporal correlation computation means 4.

The temporal correlation computation means 4 computes a temporal correlation between the temporal function a(t) and the feature temporal function b(t) in the following Equation (1).

[Mathematical Formula 1]

$$q = \frac{1}{T}\int a(t)b(t)dt \quad \text{Equation (1)}$$

The temporal correlation value q in Equation (1) changes due to a difference in phase between the temporal function a(t) and the feature temporal function b(t). That is, the temporal correlation value q corresponds to a temporal shift between the operations of the illumination means 5 and the shooting means 2. Thus, time synchronization information can be acquired from the temporal correlation value q.

CITATION LIST

Patent Literature

PLT 1: JP 2010-135926 A

SUMMARY OF INVENTION

Technical Problem

The device described in Patent Literature 1 needs to illuminate a modulated light in order to synchronize videos shot by a plurality of cameras. When a certain period of time elapses after synchronization, a temporal shift occurs between the videos and synchronization therebetween may be impossible. Therefore, a modulated light needs to be periodically illuminated in order to prevent a temporal shift between videos, which causes an increase in cost.

It is an object of the present invention to provide a time synchronization information computation device capable of synchronizing the times of a plurality of cameras without the need of a special device, a time synchronization information computation method, and a time synchronization information computation program.

Solution to Problem

A time synchronization information computation device according to the present invention is characterized by comprising a plurality of video acquisition means for acquiring videos, a plurality of visual event detection means provided corresponding to the plurality of video acquisition means for analyzing the videos acquired by the plurality of video acquisition means to detect visual events, and generating visual event detection information including information on when the visual events are detected, and visual event integration means for integrating the visual event detection information generated by the plurality of visual event detection means, and generating time synchronization information for synchronizing the times of the videos acquired by the plurality of video acquisition means.

A time synchronization information computation method according to the present invention is characterized by comprising the steps of inputting a plurality of videos therein, analyzing the plurality of input videos and detecting visual events, generating visual event detection information including information on when the visual events are detected, and integrating the generated visual event detection information and generating time synchronization information for synchronizing the times of the plurality of videos.

A time synchronization information computation program according to the present invention is characterized by causing a computer to perform a processing of inputting a plurality of videos therein, a visual event detection processing of analyzing the plurality of input videos to detect visual events, and generating visual event detection information including information on when the visual events are detected, and a visual event integration processing of integrating the generated visual event detection information and generating time synchronization information for synchronizing the times of the plurality of videos.

Advantageous Effects of Invention

According to the present invention, it is possible to synchronize the times of a plurality of cameras by detecting visual events naturally occurring during shooting without the need of a special device.

DESCRIPTION OF EMBODIMENTS

First Exemplary Embodiment

A first exemplary embodiment, according to the present invention will be described below with reference to the drawings.

Figure 1:
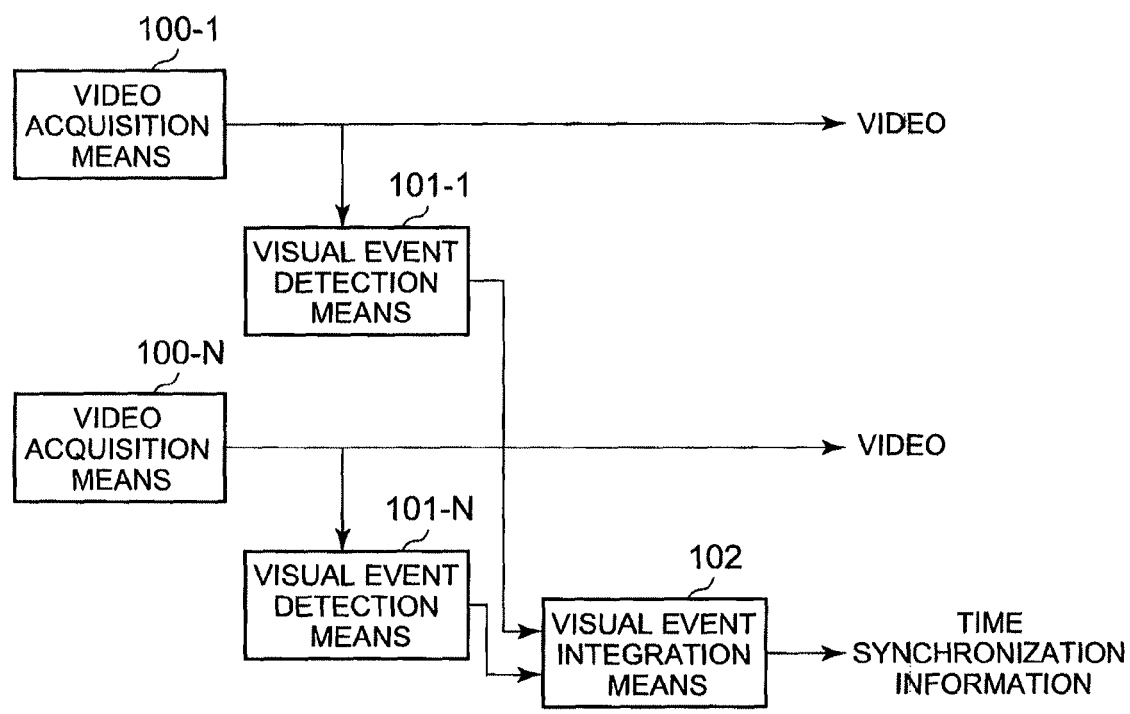
FIG. 1 It depicts a block diagram illustrating a structure of a time synchronization information computation device according to the present invention.

FIG. 1 is a block diagram illustrating a structure of a time synchronization information computation device according to the present invention. As illustrated in FIG. 1, the time synchronization information computation device comprises video acquisition means 100-1 to 100-N, visual event detection means 101-1 to 101-N, and visual event integration means 102.

The video acquisition means 100-1 to 100-N are capable of acquiring videos of a camera or the like. The video acquisition means 100-1 to 100-N output the acquired videos to the visual event detection means 101-1 to 101-N, respectively.

The video acquisition means 100-1 to 100-N may be directed for reading videos shot by a camera or the like from a recording medium. For example, when a video shot by a camera is recorded in a video tape, a device for reading the video tape may be the video acquisition means.

The visual event detection means 101-1 to 101-N have an input of the videos from the video acquisition means 100-1 to 100-N, respectively. The visual event detection means 101-1 to 101-N generate visual event detection information and output the generated visual event detection information to the visual event integration means 102, respectively.

The visual event integration means 102 has an input of the visual event detection information from the visual event detection means 101-1 to 101-N. The visual event integration means 102 generates and outputs time synchronization information.

The visual event detection means 101-1 to 101-N and the visual event integration means 102 are accomplished by a CPU provided in the time synchronization information computation device. For example, the CPU of a computer reads a time synchronization information computation program, and may operate as the visual event detection means 101-1 to 101-N and the visual event integration means 102 according to the program. The time synchronization information computation program may be recorded in a computer-readable recording medium. The visual event detection means 101-1 to 101-N and the visual event integration means 102 may be accomplished by separate hardware, respectively.

The operations of the time synchronization information computation device will be described below.

At first, the video acquisition means 100-1 to 100-N acquire videos. According to the present exemplary embodiment, the video acquisition means 100-1 to 100-N are assumed to be able to shoot almost the same area and to be arranged at positions where they can detect the same visual event.

The visual event is not limited to a visual event detectable from the videos acquired from all the video acquisition means, and may be a visual event detectable from videos acquired from only some of the video acquisition means.

The visual event is an event visually detectable from video information. The visual event may be a change in brightness of an entire screen or a partial region thereof, a change in person posture or state or an action such as bending, falling down, running or passing through a specific position, a change in state of a specific object such as automatic door or showcase door, an occurrence of a specific event such as object's dropping or breaking, or the like.

The video acquisition means 100-1 to 100-N output the acquired videos to the visual event detection means 101-1 to 101-N, respectively.

The visual event detection means 101-1 to 101-N generate a frame image from the input video and detect a visual event from the generated frame image, respectively. A visual event detection method will be described below in detail. When the input video is an analog video, the visual event detection means 101-1 to 101-N capture the videos by use of a video capture method, thereby generating a frame image. When the input video is a digital video encoded by H.264, Motion JPEG, MPEG-2 or the like, the visual event detection means 101-1 to 101-N decode the videos by a corresponding decode system thereby to generate a frame image, respectively.

The visual event detection means 101-1 to 101-N may detect a video without complete decode of the video depending a type of the visual event. In this case, the visual event detection means 101-1 to 101-N may perform essential decoding, extract the feature, and detect a visual event. For example, a change in brightness can be detected by finding a difference between average values of pixel values in each frame as described later. Thus, the visual event detection means 101-1 to 101-N may compute an average value of each frame by extracting only the DC components of each block of H.264 or MPEG-2/4 and averaging the extracted DC components.

The visual event detection means 101-1 to 101-N may not detect all the visual events described above, and may detect at least one of them.

The visual event detection means 101-1 to 101-N output the detected results as visual event detection information to the visual event integration means 102, respectively.

The visual event detection information includes information on a type of a detected event (which will be denoted as event type information below) and time information on when an occurrence of the event is detected (which will be denoted as event detection time information below). The type of an event is a change in brightness or a change in person state. The time information is associated with the videos input into the visual event detection means 101-1 to 101-N. For example, the event detection time information included in the visual event detection information output from the visual event detection means 101-1 is generated based on the time information associated with the videos input into the visual event detection means 101-1. The visual event detection information may include information on a degree of reliability of the event detection.

The visual event integration means 102 detects a temporal shift associated with the videos acquired by each video acquisition means based on the visual event detection information input from each visual event detection means, and generates information necessary for synchronizing the times of the videos, or time synchronization information.

The operations of generating time synchronization information by the visual event integration means 102 will be described herein.

Figure 2:
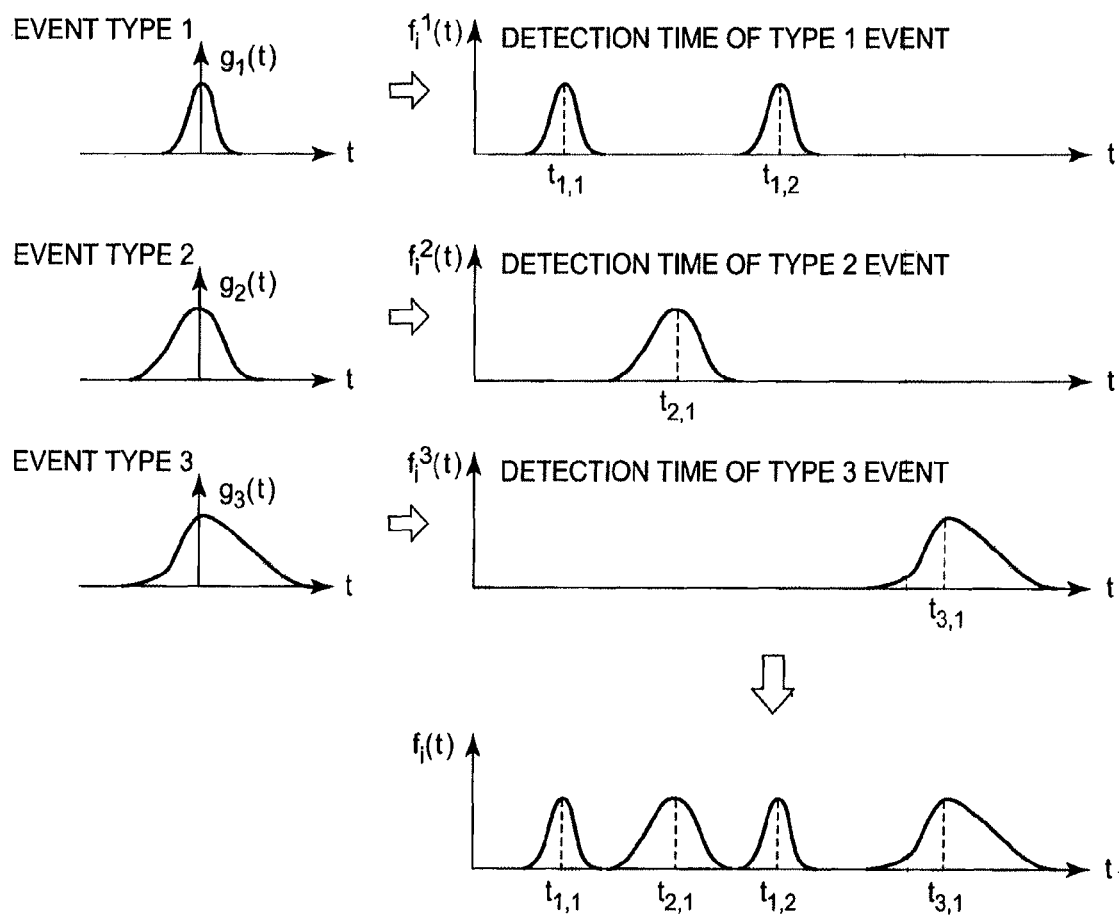
FIG. 2 It depicts an explanatory diagram illustrating how to find a visual event occurrence likelihood function $f_i(t)$.

At first, the visual event integration means 102 finds a likelihood function of each visual event occurrence from each item of visual event detection information. FIG. 2 is, an explanatory diagram illustrating how to find a visual event occurrence likelihood function $f_i(t)$. Herein, the likelihood function indicates a likelihood (probability) of an occurrence of a visual event at a certain time t. For example, a likelihood function for an event type j can be computed as in Equation (2).

[Mathematical Formula 2]

$$f_i^j = \sum_{k=1}^{K_j} g_j(t - t_{i,j,k})$$

Equation (2)

Herein, $t_{i,j,k}$ indicates the k-th detection time of the event type j included in the visual event detection information i. $K_j$ indicates the number of occurrences of an event of the event type j. $g_j(t)$ is a temporal direction likelihood distribution function for the event type j. The temporal direction likelihood distribution function $g_j(t)$ is previously stored in a storage unit (not illustrated) provided in the time synchronization information computation device.

Generally, even when an event is detected at time t, the detection time may include some errors. Therefore, the true value of the event occurrence time may slightly shift before or after. $g_j(t)$ is a function obtained by modeling how much the true value of the event occurrence time shifts before or after.

Typically, how much the true value of the event occurrence time shifts depends on a type of the event. For example, the true value slightly shifts for a change in brightness while detection time for a person action, and thus the true value largely shifts. Therefore, $g_j(t)$ may be set per event type.

If a change may be caused due to other factors such as temporal conditions including nighttime and daytime, weather conditions and illumination conditions, $g_j(t)$ may be accordingly set.

Then, the visual event integration means 102 computes time synchronization information between the videos output from the video acquisition means based on the event occurrence likelihood function computed from each item of visual event detection information. When time synchronization is taken within a time in which expansion/shrinkage of the temporal axis between the video times is not problematic, only the shift amount (offset) of the time of each video may be corrected. In this case, for $\beta_1$ to $\beta_N$ indicated in the following Equation (3), the values that maximize $F(\beta_1$ to $\beta_N)$ are found.

[Mathematical Formula 3]

$$F(\beta_1, \ldots, \beta_N) = \int \sum_j \prod_{i=1}^{N} f_i^j(t + \beta_i) dt$$

$$= \int \sum_j \prod_{i=1}^{N} \sum_{k=1}^{K_j} g_j(t + \beta_i - t_{i,j,k}) dt$$

Equation (3)

[Mathematical Formula 4]

$$\prod_{i=1}^{N} f_i^j(t + \beta_i)$$

Equation (4)

A visual event may be detected for all the video 1 to video N, and additionally may be detected for specific videos depending on a type of the visual event. For example, an event for a door state change is limited to videos including a door. In this case, a product of the likelihood function in Equation (3), or Equation (4) is computed except the videos in which the door state change cannot be detected. The computation is equivalent to computation made by always regarding the likelihood function in Equation (2) as 1 for the videos in which an event for the door state change cannot be originally detected.

In Equation (3), a degree of freedom remains for a constant shift of $\beta_1$ to $\beta_N$. That is, even when the certain shift amount is given to all of $\beta_1$ to $\beta_N$, the value of $F(\beta_1, \ldots, \beta_N)$ is the same. Therefore, any one of $\beta_1$ to $\beta_N$ is fixed and other values are found. For example, $\beta_1=0$ is assumed and other values are found.

In consideration of expansion/shrinkage of the temporal axis between the video times, the expansion/shrinkage of the temporal axis is modeled thereby to perform the similar processings to the above. For example, assuming that the expansion/shrinkage of the temporal axis is linear, the visual event integration means 102 performs the similar processings in consideration of the linear change of the temporal axis. That is, the visual event integration means 102 finds $\alpha_1$ to $\alpha_N$ and $\beta_1$ to $\beta_N$ maximizing the following Equation (5).

[Mathematical Formula 5]

$$F(\alpha_1, \ldots, \alpha_N, \beta_1, \ldots, \beta_N) = \int \sum_j \prod_{i=1}^{N} f_i^j(\alpha_i t + \beta_i) dt$$
$$= \int \sum_j \prod_{i=1}^{N} \sum_{k=1}^{K_j} g_j(\alpha_i t + \beta_i - t_{i,j,k}) dt$$

Equation (5)

Also in Equation (5), the degrees of freedom for a scale of $\alpha$ and a constant shift of $\beta$ remain, and thus other values may be found assuming $\alpha_1=1$ and $\beta_1=0$. When expansion/shrinkage of the temporal axis is expressed in a linear model, time synchronization information can be computed in this way. A more generalized function is employed for the part of $\alpha_i t + \beta_i$, thereby computing time information also when a more complicated model is employed.

When the visual event detection information includes reliability information, the information is reflected as a weight to perform the above processings. For example, a degree of reliability for detecting an event type j at time $t_{i,j,k}$, which is included in the event detection information i, is $\rho_{i,j,k}$, a value obtained by multiplying $g_j(t-t_{i,j,k})$ of the event detection information i by a weight corresponding to $\rho_{i,j,k}$ may be used to find an event occurrence likelihood function.

When synchronization information for maximizing $F(\beta_1, \ldots, \beta_N)$ or $F(\alpha_1, \ldots, \alpha_N, \beta_1, \ldots, \beta_N)$ is found, the above computation may be made for some groups without the computation for the entire visual event detection information, thereby finally achieving total integration. For example, an event that a door is open can be captured only in videos in which the door is shot. Thus, the visual event detection information generated from the videos in which the door is shot can be grouped. In this way, the visual event detection information is grouped depending on a visual event capable of being captured. After time synchronization information is found in each group, the time synchronization information may be adjusted between groups by use of a visual event capable of being captured commonly in groups, for example, a detection result such as a change in brightness.

Figure 3:
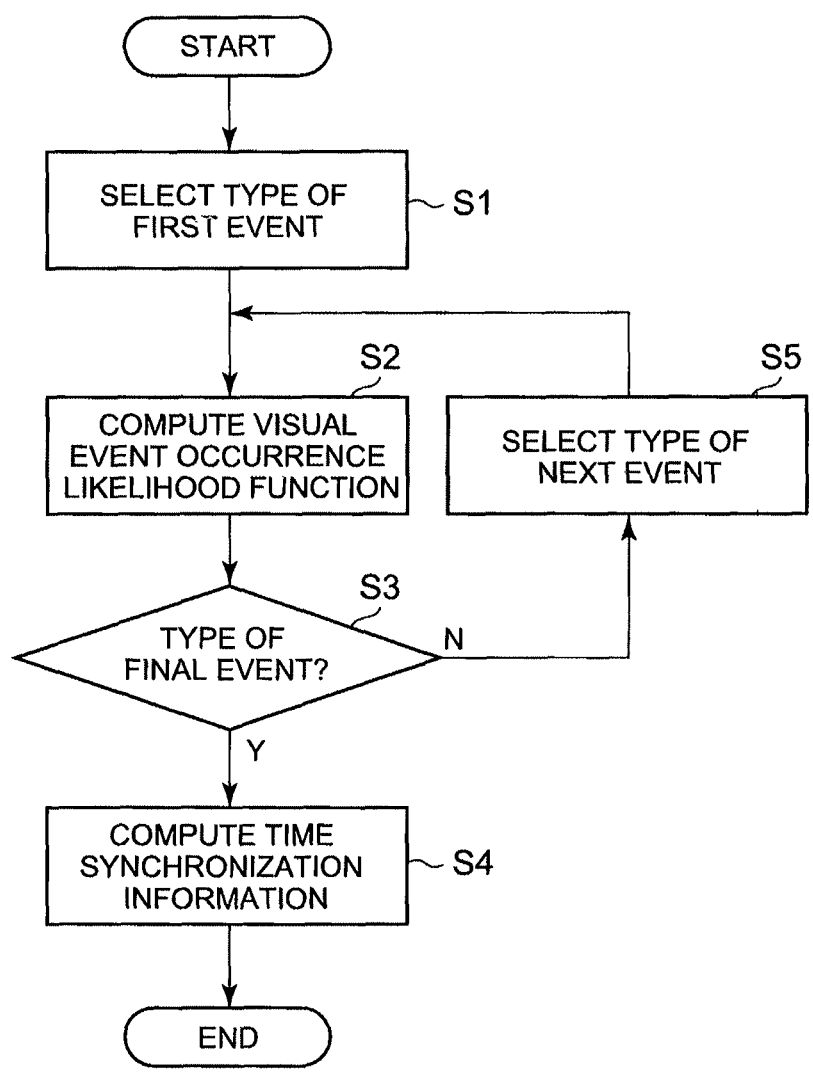
FIG. 3 It depicts a flowchart illustrating operations of a visual event integration means.

FIG. 3 is a flowchart illustrating the operations of the visual event integration means 102.

The visual event integration means 102 computes an event occurrence likelihood function one after the other for the visual events to be detected with respect to each event type (steps S1 to S3, S5).

Specifically, at first, the visual event integration means 102 selects a first event type (step S1). Then, the visual event integration means 102 computes an event occurrence likelihood function for the selected event type in the above method (step S2).

The visual event integration means 102 determines whether the event type selected in step S1 is the final event type (step S3). Herein, when the selected event type is not the final event type (N in step S3), the visual event integration means 102 selects a next event type (step S5) and returns to the processing in step S2. When the selected event type is the final event type (Y in step S3), the processing proceeds to step S4.

The visual event integration means 102 uses the event occurrence likelihood function computed in step S2 to find $\alpha_i$ (i=1 to N) or $\beta_i$ (i=1 to N) maximizing $F(\beta_1, \ldots, \beta_N)$ in Equation (3) or $F(\alpha_1, \ldots, \alpha_N, \beta_1, \ldots, \beta_N)$ in Equation (5), thereby computing time synchronization information (step S4).

As described above, according to the present exemplary embodiment, various visual events naturally occurring during shooting are detected and the times thereof are integrated in consideration of an event occurrence likelihood per event type. Thereby, information necessary for time synchronization between a plurality of videos can be generated.

Time synchronization information generated by the time synchronization information computation device is input together with videos into a video input device for inputting a plurality of videos therein, thereby taking time synchronization between the videos. Therefore, even when the time of each camera shifts from the first adjusted time between the cameras, the time synchronization information generated by the time synchronization information computation device is used thereby to synchronize the times of the videos shot by the cameras without readjustment of the times of the cameras. For example, even when the times of videos shot by a plurality of monitoring cameras shift, the videos can be synchronized.

Thereby, the position of a person or object can be extracted in association with the videos shot by the cameras. The position information extracted in this way can be used for detecting an intrusion of a person into a specific region, for example. Person's trajectories made of the extracted time-sequential position information is analyzed to be used for a system or service for acquiring information on marketing or shop layout. Further, it can be used for a system or service for extracting workers' trajectories and analyzing a working efficiency in a factory or distribution warehouse.

There has been described in the present exemplary embodiment the case in which time synchronization information is extracted from videos shot by cameras in real-time, but the stored videos shot by the cameras may be processed offline to extract time synchronization information.

There has been described in the present exemplary embodiment the case in which a visual event is always detected, but when it is previously known that a temporal shift is small, a visual event may be intermittently detected. That is, once synchronization is achieved, a visual event may not be detected for a while and synchronization may be taken again after a certain period of time. With the intermittent detection, power consumption required for extracting time synchronization information can be further reduced than in constant operation.

When videos are synchronized offline, the videos may be skipped for a certain period of time and then may be synchronized again. The video periods in which the synchronization processing is skipped may be found from previous and subsequent time synchronization information by interpolation.

In the present exemplary embodiment, time synchronization information enabling the times of a plurality of cameras to be synchronized is generated based on the visual events detected by the visual event detection means 101-1 to 101-N. Therefore, unlike the device described in Patent Literature 1, cost can be reduced without the need of using a special device such as illumination device for illuminating a modulated light.

The visual event detection means 101-1 to 101-N will be described below in detail.

A structure of the visual event detection means will be first described.

Figure 4:
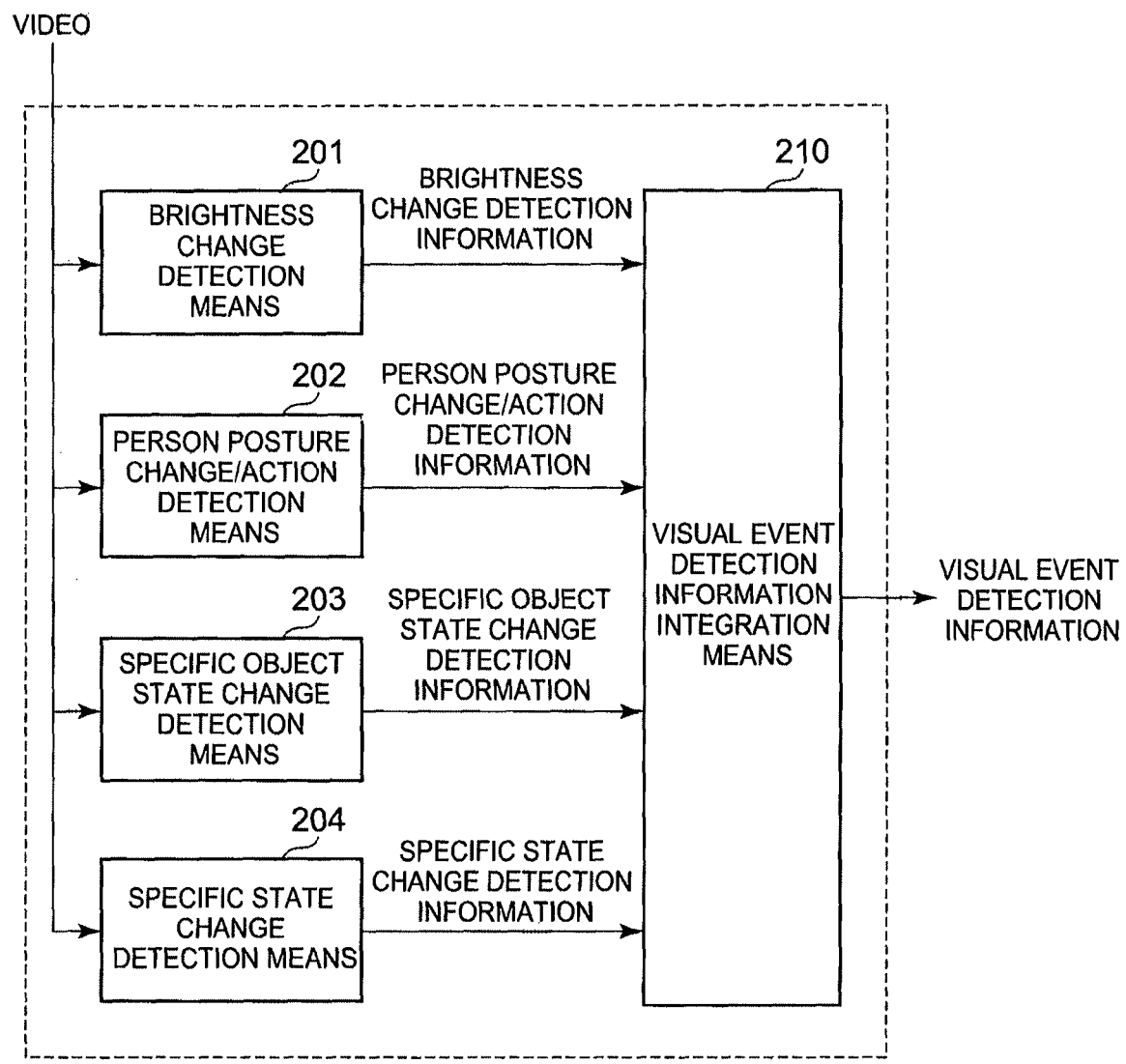
FIG. 4 It depicts a block diagram illustrating an exemplary structure of a visual event detection means.

FIG. 4 is a block diagram illustrating an exemplary structure of the visual event detection means. As illustrated in FIG. 4, the visual event detection means includes event detection means such as brightness change detection means 201, person posture change/action detection means 202, specific object state change detection means 203 and specific state change detection means 204. Further, the visual event detection means includes a visual event detection information integration means 210.

The brightness change detection means 201 has an input of videos and generates brightness change detection information based on the input videos. The brightness change detection means 201 outputs the generated brightness change detection information to the visual event detection information integration means 210.

The person posture change/action detection means 202 has an input of videos and generates person posture change/action detection information based on the input videos. The person posture change/action detection means 202 outputs the generated person posture change/action detection information to the visual event detection information integration means 210.

The specific object state change detection means 203 has an input of videos and generates specific object state change detection information based on the input videos. The specific object state change detection means 203 outputs the generated specific object state change detection information to the visual event detection information integration means 210.

The specific state change detection means 204 has an input of videos and generates specific state change detection information based on the input videos. The specific state change detection means 204 outputs the generated specific state change detection information to the visual event detection information integration means 210.

The visual event detection information integration means 210 integrates the input brightness change detection information, person posture change/action detection information, specific object state change detection information and specific state change detection information, and generates visual event detection information. The visual event detection information integration means 210 outputs the generated visual event detection information.

The outlines of the brightness change detection means 201, the person posture change/action detection means 202, the specific object state change detection means 203, the specific state change detection means 204 and the visual event detection information integration means 210 will be described below.

The brightness change detection means 201 detects brightness of the entire screen or a partial region thereof from the input video. A factor causing a change in brightness may be powering ON/OFF of illumination in a room. In this case, brightness of the entire screen changes and thus the brightness change detection means 201 detects and outputs the change.

When an illumination light in a specific area is powered ON/OFF, the brightness change detection means 201 may detect a change in brightness based on only a video region in which the area is shot. The brightness change detection means 201 may detect a change in brightness due to opening/closing of a window shade. Further, the brightness change detection means 201 may detect a change in brightness due to weather such as thunder or sunlight from behind the clouds.

The brightness change detection means 201 outputs a brightness change detection result as brightness change detection information to the visual event detection information integration means 210. The brightness change detection information includes a time when the change in brightness is detected. When information on a degree of reliability of the detection result can be acquired together with the brightness change detection information, the brightness change detection means 201 may include the information in the brightness change detection information. When the way of brightness changes is different like a change in local brightness or a change in total brightness, and a detection result is different like a change detectable only in a specific video, the brightness change detection means 201 classifies the changes and may include event type information for classification in the brightness change detection information.

The person posture change/action detection means 202 extracts a person region from an input video and detects a change in person posture or state/action. The changes in posture or state to be detected may be changes in posture or state such as bending (sitting) from a standing state, standing up from a bending (seated) state, bending to bring up an object, or stumbling over something and falling down. The person posture change/action detection means 202 may detect a change in posture caused by bowing, raising a hand, stretching or turning around. The actions to be detected may be various actions such as passing through a certain position, taking something in one hand, making a call, putting a hat on, and starting to walk.

Bowing may be regarded as both a change in posture and an action, and may be classified in either one.

The person posture change/action detection means 202 outputs a change in person posture or state or an action-detected result as person posture change/action detection information to the visual event detection information integration means 210. The person posture change/action detection information includes a time when the change in person posture or state or the action is detected, and event type information for classifying the detected change in posture/state and action. When information on a degree of reliability of the detection result can be acquired together with the person posture change/action detection information, the person posture change/action detection means 202 may include the information in the person posture change/action detection information.

The specific object state change detection means 203 extracts a region of a specific object from an input video and detects a change in state of the specific object. The state changes of specific objects to be detected may be opening/closing of a door (automatic door), opening/closing of a door of a refrigerator/freezer, switching of videos on a display, a state change of an object whose state periodically changes such as marionette clock, and the like. When the input video is a road monitoring video, the specific object state change detection means 203 may detect a change in traffic light. The detection will be described below in detail.

The specific object state change detection means 203 outputs a result in which a change in state of a specific object is detected as specific object state change detection information to the visual event detection information integration means 210. The specific object state change detection information includes a time when the change in state of the specific object is detected, and event type information for classifying the detected change in state of the specific object. When information on a degree of reliability of the detection result can be acquired together with the specific object state change detection information, the specific object state change detection means 203 may include the information in the specific object state change detection information.

The specific state change detection means 204 detects an occurrence of a specific event from an input video. The specific events to be detected may be drop, collision, corruption and the like of an object. When the input video is a road monitoring video, the specific state change detection means 204 may detect a change in stream of cars caused by a switched traffic light.

The specific state change detection means 204 outputs a result in which an occurrence of a specific state change or specific event is detected as specific state change detection information to the visual event detection information integration means 210. The specific state change detection information includes a time when the occurrence of the specific state change or specific event is detected, and event type information for classifying the detected specific state change or specific event. When information on a degree of reliability of the detection result can be acquired together with the specific state change detection information, the specific state change detection means 204 may include the information in the specific state change detection information.

The visual event detection information integration means 210 integrates the brightness change detection information, the person posture change/action detection information, the specific object state change detection information and the specific state change detection information, and outputs visual event detection information. The integration performed by the visual event detection information integration means 210 may be equivalent to multiplexing each item of information. The visual event detection information integration means 210 may sort each information in order of time and store into the visual event detection information, or collectively store in units of event type per certain period of time.

The visual event detection means 101-1 to 101-N each may not include all of the brightness change detection means 201, the person posture change/action detection means 202, the specific object state change detection means 203 and the specific state change detection means 204. For example, when the visual event detection means includes only the brightness change detection means 201 and person posture change/action detection means 202, the visual event detection information integration means 210 integrates and outputs only the output results from the brightness change detection means 201 and the person posture change/action detection means 202 in the visual event detection information integration means 210.

The structures of the brightness change detection means 201, the person posture change/action detection means 202, the specific object state change detection means 203 and the specific state change detection means 204, and the visual event detection operations will be described below in detail.

Structure of the brightness change detection means 201 will be first described.

Figure 5:
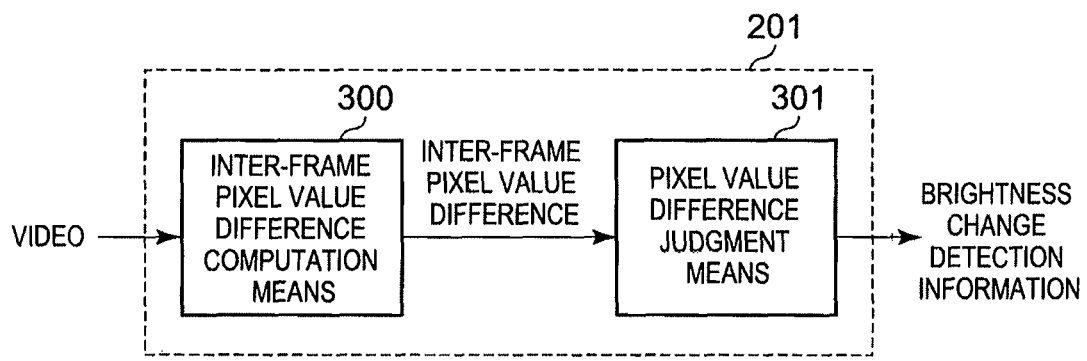
FIG. 5 It depicts a block diagram illustrating an exemplary structure of a brightness change detection means.

FIG. 5 is a block diagram illustrating an exemplary structure of the brightness change detection means 201. As illustrated in FIG. 5, the brightness change detection means 201 includes inter-frame pixel value difference computation means 300 and pixel value difference judgment means 301.

The inter-frame pixel value difference computation means 300 generates inter-frame pixel value difference information based on input videos.

The pixel value difference judgment means 301 generates brightness change detection information from the generated inter-frame pixel value difference information.

The operations of the brightness change detection means 201 will be described below.

The inter-frame pixel value difference computation means 300 has an input of videos and computes a pixel value difference between frames of the input videos.

The inter-frame pixel value difference computation means 300 may take a difference between consecutive frames or may compute an inter-frame difference between frames mutually separated by several frames.

The inter-frame pixel value difference computation means 300 may find a difference between pixel values of the frames per pixel, or may divide a frame into a plurality of regions and find a difference in statistic (such as average, total, median or norm) between pixel values per region. A pixel or region for which a difference is to be found may be in an entire screen or a partial region in the screen. The inter-frame pixel value difference computation means 300 may find a difference in statistic between pixel values computed for the total frames.

The inter-frame pixel value difference computation means 300 outputs a computation result as inter-frame pixel value difference information to the pixel value difference judgment means 301.

The pixel value difference judgment means 301 judges whether a change in brightness occurs based on the input inter-frame pixel value difference information.

For example, when the inter-frame pixel value difference information is difference information per pixel, the pixel value difference judgment means 301 judges whether a change in brightness occurs due to whether a difference value acquired from the inter-frame pixel value difference information, or statistic such as total, average, median or norm of the absolute values computed from the difference values exceeds a predetermined threshold.

The pixel value difference judgment means 301 may employ a difference value of the entire image for a difference value used for computing statistic or may find a difference value of only a specific region in the image. For example, when there is a region in which a pixel value frequently changes due to a specular reflection or the like even when brightness does not entirely change, the pixel value difference judgment means 301 may compute the statistic for pixel values of the regions except the region. When detecting a variation in brightness caused by thunder, opening/closing of a window shade, or a change in sunlight, the pixel value difference judgment means 301 may compute the statistic and judge the presence of a variation in brightness only for a region in which a pixel value easily changes when a variation in brightness is caused due to the above in a region near a window or window shade.

When the inter-frame pixel value difference information is difference information per region, the pixel value difference judgment means 301 may compute the statistic of a difference value per region, and judge the presence of a change in brightness depending on whether the computed statistic exceeds a predetermined threshold.

When the inter-frame pixel value difference information is statistic for the entire frames, the pixel value difference judgment means 301 may judge the presence of a change in brightness depending on whether the statistic exceeds a predetermined threshold.

When detecting a change in brightness, the pixel value difference judgment means 301 outputs the detected time information as brightness change detection information to the visual event detection information integration means 210.

The pixel value difference judgment means 301 may include an index indicating how much the statistic used for judging the presence of a variation in brightness exceeds the threshold, as reliability information, in the brightness change detection information.

Structure of the person posture change/action detection means 202 will be described below.

Figure 6:
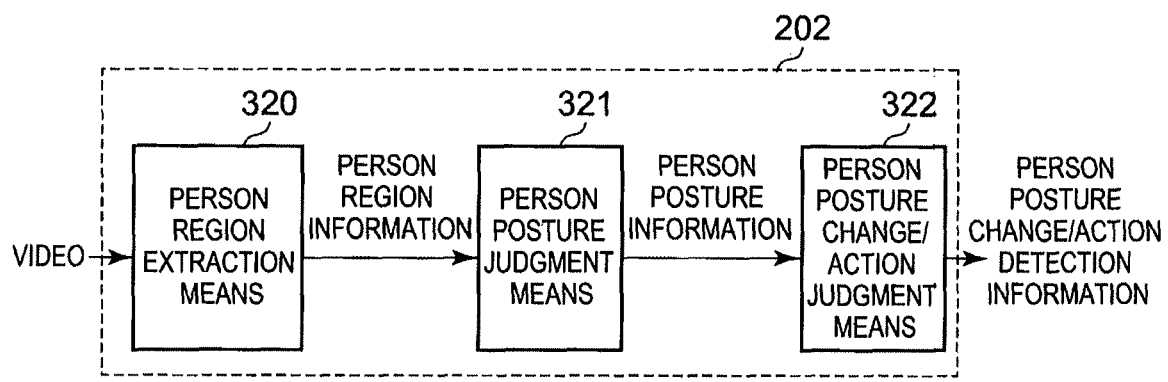
FIG. 6 It depicts a block diagram illustrating an exemplary structure of a person posture change/action detection means.

FIG. 6 is a block diagram illustrating an exemplary structure of the person posture change/action detection means 202. As illustrated in FIG. 6, the person posture change/action detection means 202 includes person region extraction means 320, person posture judgment means 321, and person posture change/action judgment means 322.

The person region extraction means 320 generates person region information based on input videos.

The person posture judgment means 321 generates person posture information by use of the generated person region information.

The person posture change/action judgment means 322 generates person posture change/action detection information by use of the generated person posture information.

The operations of the person posture change/action detection means 202 will be described below.

The person region extraction means 320 has an input of videos. The person region extraction means 320 extracts a person region from an input video. The processing of extracting a person region can be realized by various methods.

The person region extraction means 320 may employ a method for extracting a person by extracting still regions from an input image to construct a background image and computing a difference relative to the image to detect a moving object. In this case, assuming that objects other than persons are not included in the moving objects, the person region extraction means 320 may regard the moving object as person region. When objects other than persons are included in the moving objects, the person region extraction means 320 judges whether a person is present in a resultant individual moving object region, and extracts a person region. The judgment can be made by use of a discriminator trained with the features of the person region.

The person region extraction means 320 may employ a method for directly extracting a person region from an image without taking a difference between the input image and the background image. For example, there is a method for detecting part of a person region by use of a discriminator trained with the features of human body such as head, face and upper body and finding a person region from the detection result. In this case, the person region extraction means 320 acquires a certain region lower than the region where the head or face is detected as person region. Then, the person region extraction means 320 generates information on the acquired person region as person region information. The person region information is the coordinates of the upper left point and the lower right point of the rectangle surrounding the person region, for example.

The person region information may indicate a silhouette of the region found by the background difference. In this case, the person region information may be indicated by use of a region shape description system standardized in MPEG-4 video encoding or a region shape description system standardized in MPEG-7. The person region extraction means 320 outputs the acquired person region information to the person posture judgment means 321.

The person posture judgment means 321 judges a specific posture of a person included in the person region based on the input person region information. The person posture judgment means 321 judges a specific posture of a person by use of a discriminator trained with specific person postures, for example. For example, when judging a seated posture, the person posture judgment means 321 judges whether a person included in the person region is seated by use of a discriminator previously trained with the features of a seated person as person postures. When a plurality of postures to be judged are present, the person posture judgment means 321 may judge a posture by use of a discriminator trained with the features of individual postures.

The person posture judgment means 321 judges a specific posture of a person for each person region included in the person region information, and generates a judgment result as person posture information. The person posture judgment means 321 outputs the generated person posture information to the person posture change/action judgment means 322.

The person posture change/action judgment means 322 judges whether a posture of an individual person included in the person posture information indicates a specific change. For example, when a person changes from a standing state to a seated state, the person posture change/action judgment means 322 outputs information on the change time as person posture change/action detection information to the visual event detection information integration means 210. At this time, when being able to acquire information on a degree of reliability of the change detection at the same time, the person posture change/action judgment means 322 may include the acquired reliability information in the person posture change/action detection information.

Other exemplary structure of the person posture change/action detection means will be described below.

Figure 7:
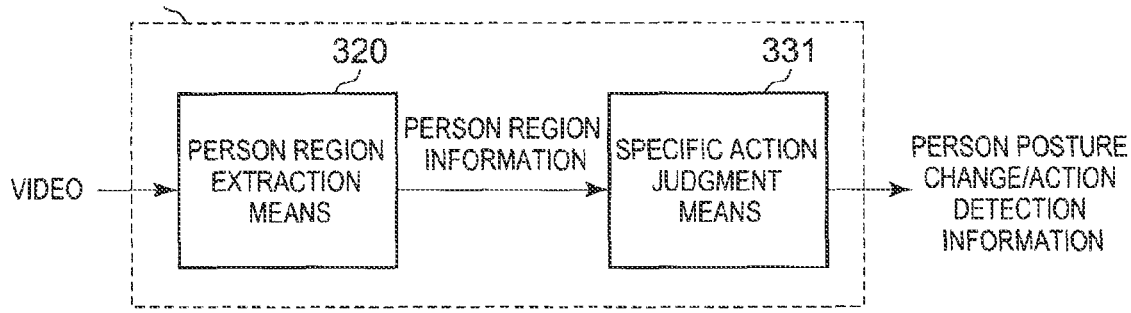
FIG. 7 It depicts a block diagram illustrating other exemplary structure of the person posture change/action detection means.

FIG. 7 is a block diagram illustrating other exemplary structure of the person posture change/action detection means. As illustrated in FIG. 7, a person posture change/action detection means 202 includes the person region extraction means 320 and specific action judgment means 331.

The specific action judgment means 331 generates person posture change/action detection information by use of person region information input by the person region extraction means 320.

The operations of the person posture change/action detection means 202 will be described below.

The person region extraction means 320 has an input of videos. The person region extraction means 320 outputs person region information acquired from the input videos to the specific action judgment means 331.

The specific action judgment means 331 judges a specific action of a person included in the person region based on the input person region information. The specific action judgment means 331 judges a specific action of a person by use of a discriminator trained with the features of specific actions of persons, for example. For example, when judging a hand-raising action, the specific action judgment means 331 judges it by use of a discriminator trained with the features of a video period in which a hand is raised. The discriminator may comprise a function of extracting and judging the features of the hand-raising action from an image itself, or may comprise a function of applying a model indicating a human shape and judging a hand-raising action from a temporal change in relative relationship of each part of the applied model.

A specific action judged by the specific action judgment means 331 may be other actions, not limited to the hand-raiding action. The specific action judgment means 331 may judge, from a change in position of the person, a specific action capable of being judged from only a change in position of the person such as "passing over a specific position (such as reference line drawn on the floor)" and "starting to walk". For example, in order to judge whether a person passes through an automatic door, the specific action judgment means 331 may judge whether a specific part of the body such as foot position or head position passes.

When a specific action is detected, the specific action judgment means 331 outputs information on the detection time as person posture change/action detection information to the visual event detection information integration means 210. At this time, when being able to acquire reliability information on the action detection at the same time, the specific action judgment means 331 may include the acquired reliability information in the person posture change/action detection information.

Structure of the specific object state change detection means 203 will be described below.

Figure 8:
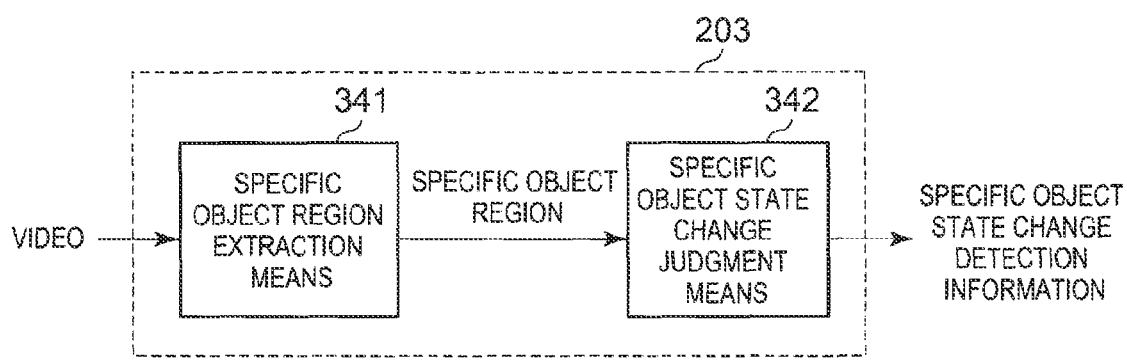
FIG. 8 It depicts a block diagram illustrating an exemplary structure of a specific object state change detection means.

FIG. 8 is a block diagram illustrating an exemplary structure of the specific object state change detection means 203. As illustrated in FIG. 8, the specific object state change detection means 203 includes specific object region extraction means 341 and specific object state change judgment means 342.

The specific object region extraction means 341 generates specific object region information based on input videos.

The specific object state change judgment means 342 generates specific object state change detection information by use of the generated specific object region information.

The operations of the specific object state change detection means 203 will be described below.

The specific object region extraction means 341 has an input of videos. The specific object region extraction means 341 detects a specific object region from the input videos. For example, when the specific object is a door or automatic door, the specific object region extraction means 341 detects a region thereof.

The specific object region extraction means 341 detects a region of a specific object (which will be denoted as specific object region below). The specific object region extraction means 341 detects a specific object region by use, of a discriminator trained with the features of specific objects, for example. The specific object region extraction means 341 outputs information on the detected region as specific object region information to the specific object state change judgment means 342. The specific object region information can be indicated in a similar description method to the person region information. When a specific object is always present at a fixed position within a screen, the user may previously store the information on the position in the specific object region information.

The specific object state change judgment means 342 judges a change in state of a specific object within the specific object region indicated by the input specific object region information. The specific object state change judgment means 342 judges a change in state of a specific object by use of a discriminator trained with the features of state changes of the specific object, for example. For example, when judging opening/closing of a door or automatic door, the specific object state change judgment means 342 judges opening/closing of the door or automatic door by use of a discriminator trained with a door-closed state and door-opened state.

The specific object state change judgment means 342 may extract an edge region of the door without using the discriminator, analyze motions of the extracted region, and judge opening/closing of the door. Specifically, when the edge region of the door starts to move from a position in the door-closed state, the specific object state change judgment means 342 judges that the door is open.

When a specific object involves a state change in which a pixel value of a specific part changes like a display, the specific object state change judgment means 342 may extract pixel value information of the specific part, judge whether it matches with a specific video, and detect a state change.

The specific object state change judgment means 342 may detect, as needed, that a black frame or specific-color frame is periodically displayed.

The specific object state change judgment means 342 may simply detect switching between shots as a state change. For example, when the specific object is a traffic light, the specific object state change judgment means 342 may detect a change in pixel values of the specific part (the traffic light part).

When the specific object involves a state change in which a usually-still part periodically moves like a marionette clock, the specific object state change judgment means 342 may detect motions of the moving part and detect its state change. The detection of motions may employ various existing systems in addition to detection using inter-frame difference or optical flow.

When detecting a specific state change of a specific object, the specific object state change judgment means 342 outputs information on the detection time as specific object state change detection information to the visual event detection information integration means 210. At this time, when being able to acquire reliability information on the state change detection at the same time, the specific object state change judgment means 342 may include the acquired reliability information in the specific object state change detection information.

Structure of the specific state change detection means 204 will be described below.

Figure 9:
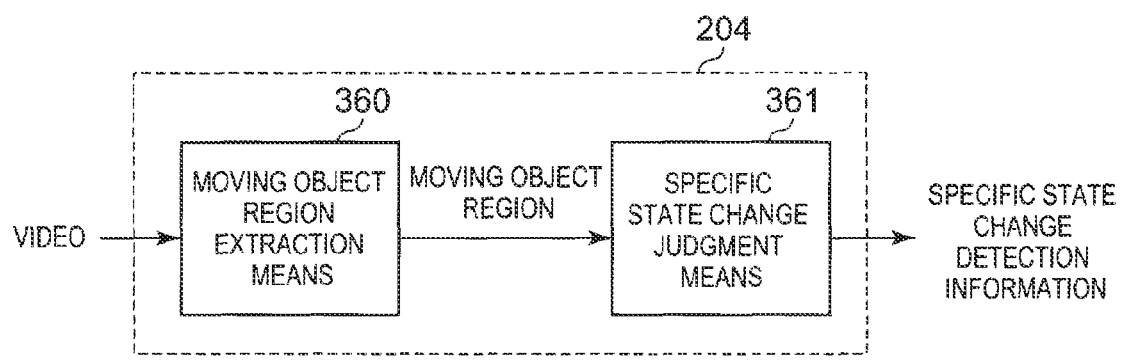
FIG. 9 It depicts a block diagram illustrating an exemplary structure of a specific state change detection means.
Figure 10:
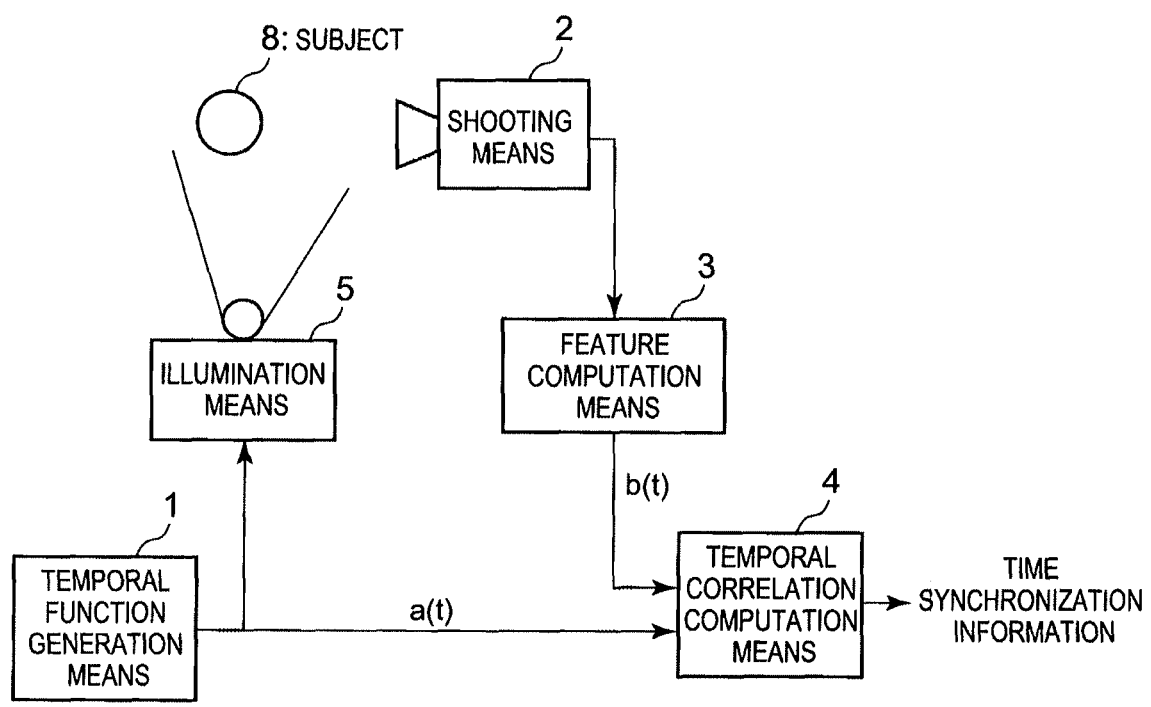
FIG. 10 It depicts an explanatory diagram illustrating an exemplary structure of a synchronization device.

FIG. 9 is a block diagram illustrating an exemplary structure of the specific state change detection means 204. As illustrated in FIG. 9, the specific state change detection means 204 includes moving object region extraction means 360 and specific state change judgment means 361.

The moving object region extraction means 360 generates moving object region information based on input videos.

The specific state change judgment means 361 generates specific state change detection information by use of the generated moving object region information.

The operations of the specific state change detection means 204 will be described below.

The moving object region extraction means 360 has an input of videos. The moving object region extraction means 360 extracts a moving object region from the input videos. The moving object region extraction means 360 outputs moving object region information indicating the extracted moving object region to the specific state change judgment means 361. The extraction processing may employ a system based on the background difference or may employ various existing methods for extracting a moving object region. The moving object region information may be indicated in a similar description system to the above person region information.

The specific state change judgment means 361 detects a specific state change of a moving object included in the moving object region indicated by the input moving object region information.

For example, when the specific state change is object's dropping, the specific state change judgment means 361 detects whether a dropping object is present in the moving objects. Specifically, the specific state change judgment means 361 analyzes motions of individual moving objects and detects a moving object moving down vertically thereby to judge whether the moving object has dropped. The detection of moving objects' motions may employ various existing systems such as system based on optical flow.

When the specific state change is collision between objects, the specific state change judgment means 361 detects collisions between a plurality of moving object regions. The specific state change judgment means 361 may detect a state in which a plurality of separated moving object regions approach each other to finally bind each other at the same position. The specific state change judgment means 361 tracks the moving object region across the frames and computes the position thereof in order to detect the bonding of the moving object regions. The tracking of moving object regions may employ various existing tracking methods.

When the video is a road monitoring video, the specific state change judgment means 361 may detect that a car starts to move from a stop state. In this case, the specific state change judgment means 361 analyzes motions of the moving object region thereby to detect that the car starts to move.

When detecting a specific state change, the specific state change judgment means 361 outputs information on the detection time as specific state change detection information. At this time, when being able to acquire reliability information on the state change detection at the same time, the specific state change judgment means 361 may include the acquired reliability information in the specific state change detection information.

The present application claims the priority based on Japanese Patent Application No. 2011-277155 filed on Dec. 19, 2011, the entirety of which disclosure is incorporated herein by reference.

The present invention has been described above with reference to the exemplary embodiment, but the present invention is not limited to the exemplary embodiment. The structure or details of the present invention may be variously modified within the scope understood by those skilled in the art.

REFERENCE SIGNS LIST

1 Temporal function generation means
2 Shooting means
3 Feature computation means
4 Temporal correlation computation means
5 Illumination means
8 Subject
100-1 to 100-N Video acquisition means
101-1 to 101-N Visual event detection means
102 Visual event integration means
201 Brightness change detection means
202 Person posture change/action detection means
203 Specific object state change detection means
204 Specific state change detection means
210 Visual event detection information integration means
300 Inter-frame pixel value difference computation means
301 Pixel value difference judgment means
320 Person region extraction means
321 Person posture judgment means
322 Person posture change/action judgment means
331 Specific action judgment means
341 Specific objet region extraction means
342 Specific object state change judgment means
360 Moving object region extraction means
361 Specific state change judgment means

The invention claimed is:

1. A time synchronization information computation device comprising:
a plurality of visual event detection units provided corresponding to a plurality of video acquisition units for analyzing the videos acquired by the plurality of video acquisition units to detect visual events, and generating visual event detection information including information on when the visual events are detected; and
a visual event integration unit for integrating the visual event detection information generated by the plurality of visual event detection units, and generating time synchronization information which is used to synchronize the times of the videos acquired by the plurality of video acquisition units by correcting time shifts associated with the information on when the visual events are detected, based on likelihoods of the visual events to occur.

2. The time synchronization information computation device according to claim 1,
wherein the visual event integration unit finds an event occurrence likelihood function indicating a likelihood in which a detected visual event occurs as a temporal function based on the visual event detection information input by the plurality of visual event detection units, and
computes the amount of correction in a temporal axis direction that maximizes a value obtained by correcting in the temporal axis direction the event occurrence likelihood function corresponding to each item of visual event detection information, and generates time synchronization information including the computed amount of correction.

3. The time synchronization information computation device according to claim 2,
wherein the visual event integration unit stores a function on which a detection time likelihood is reflected per event type, and
generates an event occurrence likelihood function based on a detection time of each visual event and the function.

4. The time synchronization information computation device according to claim 3,
wherein the visual event integration unit acquires a degree of reliability of visual event detection from the visual event detection information,
multiplies a function on which a detection time likelihood is reflected by the degree of reliability of visual event detection, and
generates an event occurrence likelihood function based on a detection time of each visual event and the function multiplied by the degree of reliability of visual event detection.

5. The time synchronization information computation device according to claim 1,
wherein the visual event detection means unit includes:
one or a plurality of event detection unit for detecting a visual event; and
a visual event detection result integration unit for integrating detection results of the event detection unit and outputting the integrated detection results as visual event detection information.

6. The time synchronization information computation device according to claim 5,
wherein the event detection unit is any one of brightness change detection unit for detecting a change in brightness as a visual event from an input video, a person posture change/action detection unit for detecting a change in posture or an action of a person in an input video as a visual event, a specific object state change detection unit for detecting a state change of a specific object as a visual event from an input video, and a specific state change detection unit for detecting an occurrence of a specific state or event as a visual event from an input video.

7. A time synchronization information computation method comprising the steps of:
- inputting a plurality of videos therein;
- analyzing the plurality of input videos and detecting visual events;
- generating visual event detection information including information on when the visual events are detected; and
- integrating the generated visual event detection information, and generating time synchronization information which is used to synchronize the times of the plurality of videos by correcting time shifts associated with the information on when the visual events are detected, based on likelihoods of the visual events to occur.

8. The time synchronization information computation method according to claim 7, comprising the steps of:
- finding an event occurrence likelihood function indicating a likelihood in which a detected visual event occurs as a temporal function based on the visual event detection information; and
- computing the amount of correction in a temporal axis direction that maximizes a value obtained by correcting in the temporal axis direction the event occurrence likelihood function corresponding to each item of visual event detection information, and generating time synchronization information including the computed amount of correction.

9. A non-transitory computer-readable recording medium in which a time synchronization information computation program is recorded, the time synchronization information computation program causing a computer to perform:
- a processing of inputting a plurality of videos therein;
- a visual event detection processing of analyzing the plurality of input videos to detect visual events, and generating visual event detection information including information on when the visual events are detected; and
- a visual event integration processing of integrating the generated visual event detection information and generating time synchronization information which is used to synchronize the times of the plurality of videos by correcting time shifts associated with the information on when the visual events are detected, based on likelihoods of the visual events to occur.

10. The non-transitory computer-readable recording medium in which the time synchronization information computation program is recorded, according to claim 9, the program causing a computer to perform:
- in the visual event integration processing, the program causes the computer to execute:
- a processing of finding an event occurrence likelihood function indicating a likelihood in which a detected visual event occurs as a temporal function based on the input visual event detection information; and
- a processing of computing the amount of correction in a temporal axis direction that maximizes a value obtained by correcting in the temporal axis direction the event occurrence likelihood function corresponding to each item of visual event detection information, and generating time synchronization information including the computed amount of correction.

11. A time synchronization device comprising:
- at least one input terminal for inputting videos acquired from a plurality of video acquisition devices;
- a processor configured to detect visual events corresponding to the videos and to generate synchronization information based on when the visual events are detected, and based on likelihoods of the visual events to occur,
- wherein the synchronization information is for synchronizing the times of the videos relative to each other by correcting time shifts associated with the information on when the visual events are detected.

12. The time synchronization device according to claim 11, wherein the synchronization information comprises a plurality of time shifts for synchronizing the times of the videos based on the relative times associated with the detected events.

* * * * *